United States Patent [19]

Hittel et al.

[11] 4,277,732
[45] Jul. 7, 1981

[54] LOW POWER STEPPING MOTOR DRIVER CIRCUIT AND METHOD

[75] Inventors: Lorenz A. Hittel, Paradise Valley; Raymond H. Yurcik, Jr., Peoria, both of Ariz.

[73] Assignee: Graphtek, Inc., Phoenix, Ariz.

[21] Appl. No.: 63,173

[22] Filed: Aug. 3, 1979

[51] Int. Cl.³ .................................................. G05B 19/40
[52] U.S. Cl. ..................................... 318/696; 318/685
[58] Field of Search .......................... 318/696, 685, 434

[56] References Cited

U.S. PATENT DOCUMENTS

| | | | |
|---|---|---|---|
| 3,757,193 | 9/1973 | Inaba et al. | 318/434 X |
| 3,890,554 | 6/1975 | Yoshitake et al. | 318/696 |
| 3,919,608 | 11/1975 | Usami et al. | 318/696 |

Primary Examiner—B. Dobeck
Attorney, Agent, or Firm—Cahill, Sutton & Thomas

[57] ABSTRACT

A stepping motor driver system includes a switching system which sequentially selects windings of a stepper motor in a predetermined pattern to effect stepping of the rotor of the stepping motor from one "hold" position to the next. The stepping motor drive system sequentially connects a high supply voltage to each of the windings to achieve rapid current buildup in the selected windings and to maintain a predetermined average current in the selected windings. An input circuit responsive to a power control signal electrically disconnects the stepping motor windings from the power supply and electrically connects a low current holding current source to the windings so that a low holding current flows through the selected windings, maintaining a "holding" torque on the rotor at a predetermined stepping position thereof. Low power consumption, rapid frictional damping of mechanical oscillation of the rotor, and elimination of audio hum are thereby attained when the rotor is in a hold position.

16 Claims, 2 Drawing Figures

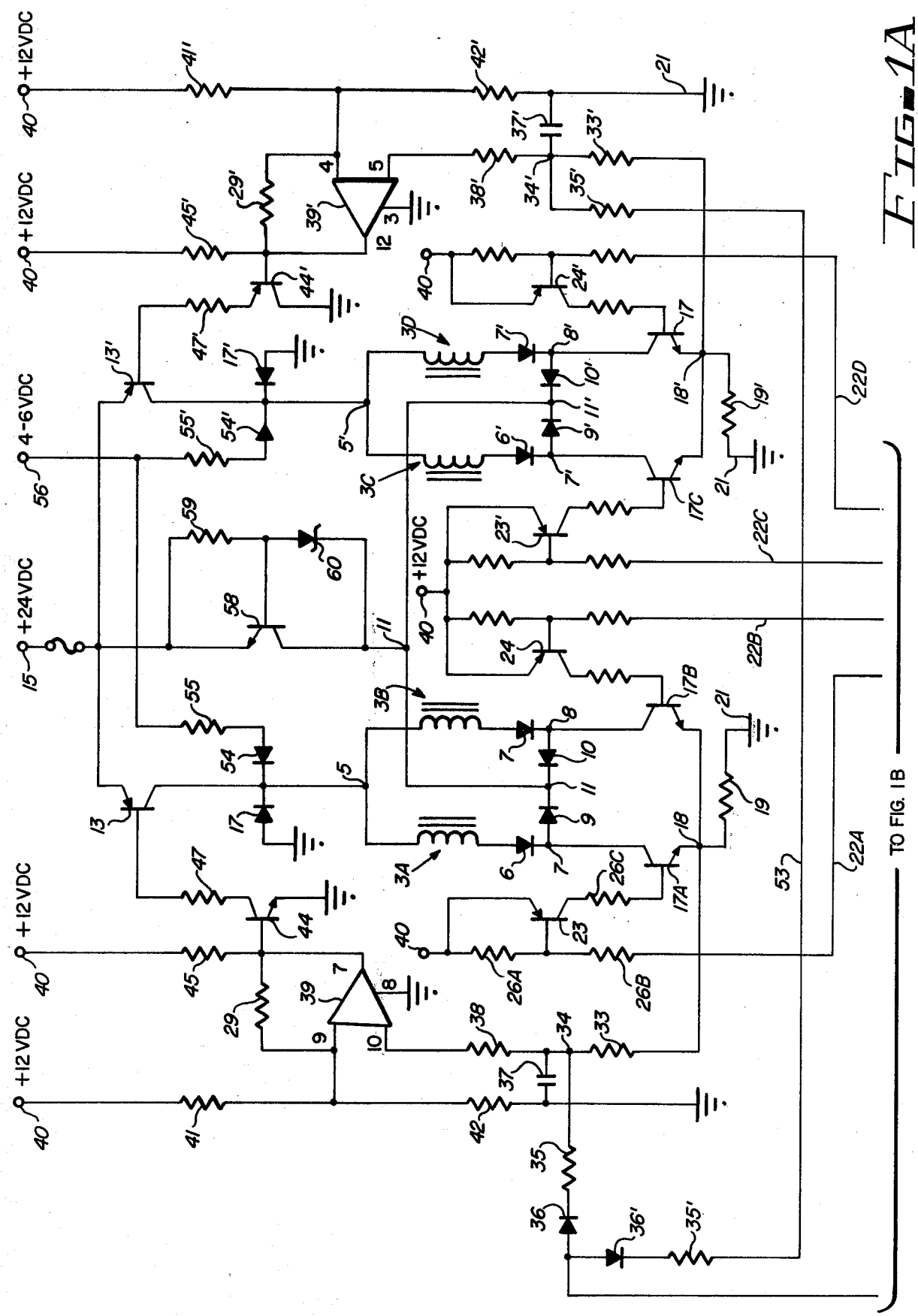

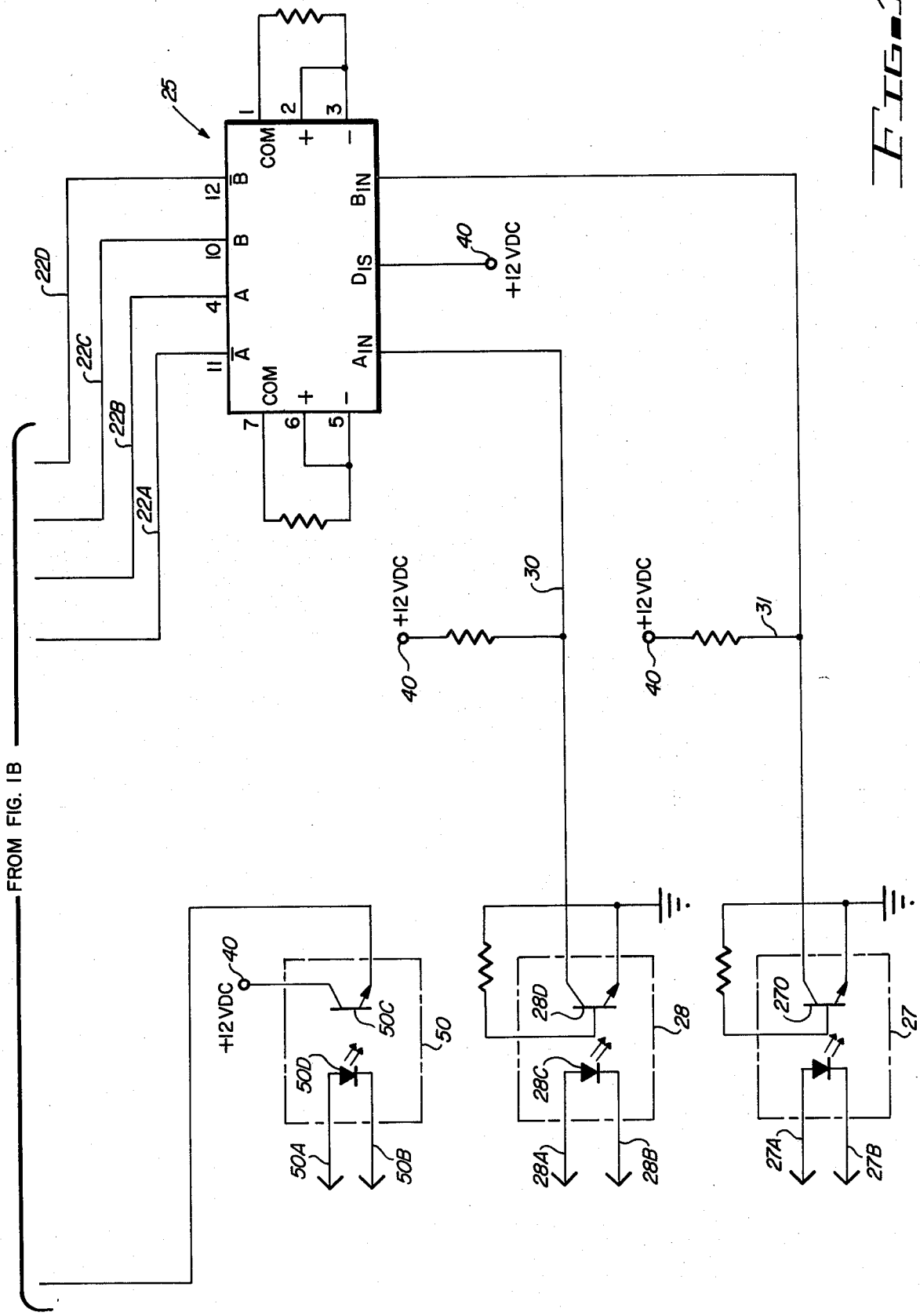

LOW POWER STEPPING MOTOR DRIVER CIRCUIT AND METHOD

BACKGROUND OF THE INVENTION

1. Field of the Invention:

The invention relates to methods and circuits for controlling stepping motors, and particularly to low power methods and circuits for controlling stepping motors.

2. Description of the Prior Art:

Stepping motors are widely utilized in many kinds of precision mechanical equipment requiring precise, controlled positioning. Stepping motors are capable of rapidly incrementally rotating their rotors by small precise angles. For example, the 6000 series stepping motors manufactured by Superior Electric Company can increment their rotors by "step" angles of $1.8° \pm 5\%$ when driven in their full step mode and 0.9 when driven in their half-step mode. A stepping motor is controlled by digital current signals which cause the stator windings of the stepping motor to be energized in a predetermined pattern. A wide variety of stepping motor control systems for producing the necessary digital control signals are commercially available.

In many applications, it is highly desirable that a stepping motor be capable of being "stepped" or incremented at a very high rate of speed, even when the stepping motor is driving a full load. It is also frequently desirable that the stepping motor be able to or maintain a particular step position or angle and strongly resist any deviation from that step position or angle until subsequent stepping signals are received from the stepping motor control system. Unfortunately, in order to achieve high stepping rates and or high holding torques, very large amounts of power must be supplied to the starter windings of the stepping motor.

Accordingly, it is an object of the invention to provide a stepping motor driver system which achieves high stepping rates, yet requires substantially less power than known stepping motor driver systems.

Another difficulty associated with conventional stepping motor systems is that when known control systems are designed to attain high stepping rates, very large amounts of torque are applied to the rotor to increment it from one step position to the next. This is especially true when a large amount of mass including the mass of the rotor and the mass of a load driven by the rotor, must be accelerated and stopped during a stepping operation. The large amounts of torque frequently result in considerable "overshoot" of the rotor, causing undesired oscillation of the rotor and mass attached thereto about the desired step position or angle. The oscillation continues until it is damped out by whatever damping friction, such as bearing friction, may be available. The time required for damping of such mechanical oscillations is frequently a serious limiting factor in operation of the system driven by the stepper motors.

Accordingly, it is another object of the invention to provide a stepping motor system including stepping motor driver circuitry which achieves high stepping rates, yet reduces the amount of rotor overshoot associated with prior stepping motor control systems and also reduces the amount of time required for damping of oscillations of the rotor about a desired step position.

When stepping motor rotors are advanced to a particular step, angle or position, they are "held" at that step position by a relatively high holding torque. A conventional technique for controlling current applied to the stator windings to achieve rapid current buildup in the windings and also to attain a predetermined average winding current in order to attain high stepping rates and high holding torques involves repetitively switching of terminals of the stator windings to a high voltage source. This results in a high rate of current increase or build-up selected rotor windings. Conventional stepping motor drive systems frequently switch the stator winding currents to the high voltage source at rates in the range from three to five kilohertz. The resulting collapsing and expanding magnetic fields in the stepping motor stator windings interact with metallic parts of the stepping motor, causing them to produce an irritating hum or buzz.

Accordingly, still another object of the invention is to provide a stepping motor driver system which reduces or eliminates audio hum.

SUMMARY OF THE INVENTION

Briefly described, and in accordance with one embodiment thereof, the invention provides a method and apparatus for reducing power consumption by a system including a stepping motor and a stepping motor driver circuit wherein rapid buildup of current in windings of the stepping motor is achieved by repetitively switching a high voltage power source to terminals of the stepping motor stator windings at a rate which maintains predetermined average currents in the selected stepper motor windings during the operation of advancing the stepping motor rotor from a first step position to a second step position. A "power down" input signal is applied to circuitry which decouples the winding terminals from the high voltage power source and produces a constant DC holding current through the selected stator windings. The constant DC holding current is produced by means of a low voltage power source and a resistor coupled in series with the selected stepping motor windings. The power down input signal is applied to the stepping motor driver circuitry after the rotor has rotated part of the way between the first and second step position but before the rotor actually reaches the second step position in order to minimize "overshooting" of the rotor past the second step position and to minimize the amount of time required for friction associated the the rotor to "damp" mechanical oscillations of the rotor about the second step position. Further, the DC holding current eliminates audio hum while the rotor is being maintained at the second step position by a holding torque produced by the winding in response to the DC holding current. The apparatus and method of the present invention provide a stepping motor system which consumes a relatively small amount of power in the holding mode, minimizes the time required for frictional damping of rotor oscillation about step positions, and yet achieves rapid current buildup in the stepping motor windings to enable rapid rotation of the rotor from one step position to another. Further, audio hum caused by interaction of the chopped DC stepping current and iron containing components of the stepping motor is eliminated.

BRIEF DESCRIPTION OF THE DRAWINGS

FIGS. 1A and 1B comprise the schematic drawing of a low power stepping motor driver system of the present invention.

DESCRIPTION OF THE INVENTION

Referring now to FIGS. 1A and 1B, stepping motor driver circuitry 1 receives digital control inputs from a stepping motor control system (not shown). The digital inputs include a "power down" input applied to between terminals 50A and 50B, a first logic signal applied between terminals 27A and 27B, and a second logic signal applied between terminals 28A and 28B.

The power down control signal causes stepping motor drive circuitry 1 to generate a DC "hold" signal which maintains a stepping motor rotor (not shown) at a particular step position or angle. The first and second logic signals are decoded to achieve "selection" of four transistor switches (subsequently described) which permit four stepping motor stator windings, respectively, to be selected and energized in order to advance or "step" the rotor.

The structure and operation of stepping motors are well known in the art, and therefore need not be set forth in detail herein. Stepping motor control systems are also well known in the art, and therefore are also not described herein.

For convenience of illustration, only the four stator windings (hereinafter referred to simply as windings) 3A, 3B, 3C, and 3D of a stepping motor are schematically shown in FIG. 1A. Windings 3A and 3B have a common terminal 5, and windings 3C and 3D have a common terminal 5'. Terminal 5 and terminal 5' are respectively electrically coupled or switched to a twenty-four volt power supply conductor 15 by means of switching transistors 13 and 13', respectively.

Winding 3A has a second terminal connected to the anode of diode 6, which has its cathode connected to conductor 7. Conductor 7 is connected to the collector of switching transistor 17A and also to the anode of diode 9, which has its cathode connected to conductor 11. Similarly, the second terminal of winding 3B is connected by means of diode 7 to conductor 8, which is connected to the collector of switching transistor 17B. Conductor 8 is coupled to conductor 11 by means of diode 10. The emitters of switching transistors 17A and 17B are joined together by conductor 18. Feedback resistor 19 is connected between conductor 18 and ground conductor 21.

Transistors 17A and 17B are respectively turned on in response to signals produced on conductors 22A and 22B, respectively, by decode circuit 25, which in the described embodiment of the invention is a Motorola MC14583B dual CMOS Schmitt trigger with complementary outputs, manufactured by Motorola, Inc. When the logic signal on conductor 22A is a logical "zero", resistors 26A and 26B function as a voltage divider circuit which produces a turn-on signal at the base of PNP transistor 23. A turn-on current flows from power supply terminal 40, which has a positive 12 volt voltage thereon, through the emitter and collector of transistor 23 and into the base of switching transistor 17A. This causes a current to flow through winding 3A if transistor 13 is on. When transistor 17A is on, winding 3A is said to be "selected".

Similarly, if a logical "zero" is applied to conductor 22B by circuit 25, switching transistor 17B will be turned on, and winding 3B will be selected. The signals produced on conductors 22A and 22B by decoder 25 are complementary signals. Thus, one of transistors 17A and 17B, but only one of them, is always turned on and the other is always turned off.

It should also be noted that transistors 17C and 17D are similarly coupled to windings 3C and 3D and to decoder 25. Corresponding "primed" reference numerals are used to designate corresponding elements in FIG. 1A.

Conductor 18 is connected by means of resistor 33 to conductor 34. Conductor 34 is connected by means of resistor 38 to the negative input of operational amplifier 39. Resistor 35 is connected between conductor 34 and the cathode of diode 36, which has its anode connected to the emitter of phototransistor 50C. The collector of light emitting diode 50C is connected to supply voltage conductor 40. Photo transistor 50C and light emitting diode 50D form an optical coupler 50 having input terminals 50A and 50B to which the above mentioned power down signal is applied. A filter capacitor 37 is connected between ground conductor 21 and conductor 34.

The positive input of operational amplifier 39 is connected to reference voltage produced at the junction between resistors 41 and 42. Resistors 41 and 42 are connected in series between supply voltage conductor 40 and ground conductor 21. The output of operational amplifier 39 is connected to the base of NPN transistor 44, which has its emitter corrected to ground conductor 21 and its collector corrected to resistor 47. Resistor 47 is also corrected to the base of PNP switching transistor 13. PNP switching 13 has its emitter connected to supply voltage conductor 15 and its collector connected to terminal 5.

Diode 17 has its cathode connected to terminal 5 and its anode connected to ground conductor 21. Diode 24 has its cathode connected to terminal 5 and its anode coupled by means of resistor 55 to supply voltage conductor 56, which, in the described embodiment of the invention has a supply voltage in the range from 4 to 6 volts applied thereto.

It should be noted that circuitry similar to that described above is repeated in the right hand side of FIG. 1A; corresponding components are identified by primed reference numerals, and such connections are not described in detail, since they are clearly shown in the drawing.

Those skilled in the art can readily select exemplary values for the above described resistors. The component parameters for the corresponding components identified by primed reference numerals in the drawing have values which are identical to the values of the components identified by the corresponding unprimed reference numerals.

The stepping motor of which the stater windings are schematically shown in FIG. 1A is a model MO91-FDO6, manufactured by Superior Electric Corporation. However, numerous other commercially available stepping motors could also be used.

It should be noted that the switching transistors 17A–17D are preferably implemented by means of high gain Darlington devices which are readily available, although suitable high gain, high power switching transistors could also be utilized.

It should be noted that the complementary logic signals on the conductors 22A and 22B corresponding to the logic level and its complement are produced in response to the first logic signal applied between conductors 28A and 28B. Similarly, logic signals on 22C and 22D are complementary logic signals produced in response to the second logic signal applied between conductors 27A and 27B.

Thus, the first logic signal determines which of windings 3A and 3B are selected, and the second logic signal determines which of windings 3C and 3D are selected. The four possible states of the first and second logic signals thus determine four possible combinations of energizing stator windings 3A, 3B, 3C, and 3D.

Advancing or stepping of the stepper motor rotor is accomplished in response to a proper sequential application of the four possible logic states of the first and second logic signals in a manner well known to those skilled in the art. This sequence will be set forth in the specification sheet for commercially available stepping motors.

To describe the operation of the stepping motor drive circuitry 1, in accordance with the present invention, it is convenient to initially assume that a stepping operation to advance the rotor from one step position to the next step position has been initiated.

Also assume that power down signal applied between terminals 50A and 50B is at a logical "zero", so that photo transistor 50C is off. For purposes of illustration, assume that the logic level of the first logic signal produces a logic "1" on conductor 22A and a logical "0" on conductor 22B. This causes switching transistor 17A to be turned on, causing switching transistor 17B to be turned off.

It is also convenient to initially assume that PNP switching transistor 13 is turned on, and that the initial voltage of conductor 18 is close to ground potential.

Since the voltage of conductor 18 is relatively low, and since phototransistor 50C is off, the voltage on conductor 34 is close to ground voltage. This causes a low voltage to be applied to the negative input of operational amplifier 39. Since the positive input of operational amplifier 39 is at a relatively high reference voltage (approximately 1.3 to 1.5 volts) the output of operational amplifier rises to a level which turns NPN transistor 44 on, saturating it and thereby turning PNP transistor 13 on, saturating PNP transistor 13. This operation electrically couples terminal 5 of windings 3A and 3B to the positive 24 volts of voltage supply conductor 15.

Since transistor 17A is on, current begins to build up in winding 3A at a rate determined by the magnitude of the voltage (nearly 24 volts) on terminal 5 of windings 3A and 3B and the inductance of winding 3A. The current in winding 3A flows through the collector and emitter of switching transistor 17A and feedback resistor 19, thereby increasing the voltage on conductor 18.

The voltage on conductor 18 continues to increase until the voltage applied to the negative input of operational amplifier 39 exceeds the threshold voltage applied to the positive input thereof. Capacitor 37 and resistors 33 and 38 operate as a filter which smooths the triangular waveform on conductor 18 to provide an input to the negative input of operational amplifier 39. When this occurs, the output of operational amplifier 39 decreases to a level which turns NPN transistor 44 off. This, in turn, turns PNP switching transistor 13 off, decoupling terminal 5 of windings 3A and 3B from the positive 24 volt supply voltage.

Since winding 3A has a high inductance, at this point winding 3A has a large amount of energy stored in its magnetic field as a result of the previously described buildup of current. Therefore, the current continues to flow through winding 3A, which now acts as a current source, since terminals 5 have been decoupled from the 24 volt supply voltage. The polarity of the voltage across winding 3A reverses, and the voltage of conductor 7 begins to increase, formed biasing diode 9 and causing the voltage of conductor 11 to increase. When conductor 11 reaches a voltage which is approximately twice the voltage of supply voltage conductor 15, i.e., approximately 48 volts, zener diode 60 breaks down, turning on NPN transistor 58, which limits further increases in the voltage of conductor 11 by shunting excess current from conductor 11 into voltage supply conductor 15. Diode 10 is reverse biased, and blocks voltage on conductor 11 from the collector of transistor 17B.

As the voltage on conductor 11 increases, as described above, the current through winding 3A continues to flow through switching transistor 17A and feedback resistor 19, but at a decreasing rate. This causes the voltage on conductor 18 to decrease. When the voltage on conductor 18 has fallen to a level such that the negative input of operational amplifier 39 is less than the threshold voltage applied to the positive input of operational amplifier 39, the output of operational amplifier 39 again increases, turning on NPN transistor 23 and PNP transistor 13.

Thus, it can be seen that PNP transistor 13 repetitively turns on and off at a rate determined mainly by the inductance of winding 3A and the resistance of feedback resistor 19, thereby maintaining an average current level in winding 3A. In the described embodiment of the invention, the average current value was approximately three amperes. This average current value produces sufficient torque on the rotor (not shown) of the stepping motor to cause rapid acceleration of the rotor from its initial or first step position to the desired second step position. The above described switching operation results in very steep rise in the current waveform of the current through winding 3A when PNP switching transistor 13 is on, thereby accomplishing very rapid initial current buildup in winding 3A. The rapid initial current buildup ensures that maximum torque is applied to the rotor in a minimum amount of time, thereby greatly decreasing the stepping time, i.e, the amount of time required to advance the stepping motor rotor from one step position to another.

As previously explained, a very large amount of power dissipation occurs as a result of the above mentioned three ampere average current flow through winding 3A. In an entirely similar manner to that described above, an average three ampere current flows through the one of windings 3C and 3D selected in response to the second logic signal, since the operation of the circuitry coupled between conductor 18' and the base of PNP switching transistor 13' is entirely similar to that previously described. The power dissipation due to these two three ampere average currents belonging to the two selected stator windings is roughly 124 watts.

In accordance with the present invention, after the stepping motor rotor has accelerated and has accomplished a predetermined portion of its rotational transition from the first step position to the second step position, the previously mentioned power down logic signal is applied between conductors 50A and 50B of optical coupler 50, turning photo transistor 50C on. This forward biases diodes 36 and 36', thereby producing increased voltages at nodes 34 and 34', respectively. The increased voltages on nodes 34 and 34' produce low voltages at the respective outputs of operational amplifier 39 and 39', thereby causing PNP switching transistors 13 and 13' to be turned off in the fashion previously described. The current flowing through the selected windings then decays gradually, causing the voltage across feedback resistors 19 and 19' to decrease. As the decaying continues, the voltages of terminal 5 and 5' fall toward ground, forward biasing diodes 54 and 54' and causing currents to flow from voltage supply conductor 56 through resistors 55 and 55' into terminals 5 and 5', respectively. The currents flowing through resistors 55 and 55' are referred to as the "DC holding" currents and can be approximately equal to one ampere. The one ampere DC holding currents flow through the selected windings holding torque upon the rotor when it reaches the desired step position, which holding torque is less than the holding torque which would be produced by the above mentioned three ampere average current flowing from 24 volt supply voltage conductor 15.

Due to the fact that the constant one ampere DC holding currents flow across the voltage drop of only 4 to 6 volts, the power consumption of the circuitry of FIGS. 1A and 1B during the hold operation is very low compared to the power consumption which would be result if the three ampere average holding currents (which flow across a 24 volt voltage drop) described above are utilized to maintain the rotor at the second step position. Even if the constant DC holding currents are increased to three amperes the above mentioned to equal three amperes by average currents adjusting the values of resistors 55 and 55' so that the holding torque applied to the rotor by the stator windings is equal to that when a three ampere average current from 24 volt supply conductor 15 is utilized, the power dissipation is much lower due to the much lower voltage drop (4 to 6 volts) across which the constant three ampere DC holding current flows.

In accordance with the invention, the reduced one ampere holding current is applied to provide a reduced holding torque on the rotor before the rotor has undergone its entire rotational displacement from the first step position to the second step position in order to eliminate or reduce the overshoot which results when maximum torque is applied to the rotor during the entire rotational displacement of the rotor from the first stepping position to the second stepping position.

By reducing the holding torque before the rotor has undergone a complete stepping angular transition, available frictional damping dampens the overshoot and any succeeding oscillations of the rotor in substantially less time than is required if the maximum torque (corresponding to the three ampere average winding current) is applied continuously.

Another significant advantage of utilizing a constant DC holding current is that the previously mentioned audio hum is eliminated. Since, in many applications, a stepping motor rests in a hold mode most of the time, elimination of the audio hum, which can be very annoying, is highly desirable.

It should be recognized that operation of this circuitry associated with transistors 17C and 17D is analogous to the operation described above, and therefore is not repeated.

While the invention has been described with reference to a particular embodiment thereof, those skilled in the art will recognize that variations in the described apparatus and method can be readily provided by those skilled in the art without departing from the true spirit and scope of the invention, as set forth in the appended claims.

What is claimed is:

1. A method of operating a stepping motor to advance the rotor of the stepping motor from a first step position to a second step position, said method comprising the steps of:
   a. coupling a first terminal of a winding of the stepping motor to a first voltage supply conductor in response to a first control signal to cause a winding current to increase in the winding;
   b. sensing said winding current by causing said winding current to flow through a resistor;
   c. producing said first control signal and a second control signal in response to a voltage produced across said resistor by said winding current, said second control signal indicating when said winding current exceeds a first predetermined level, said first control signal indicating when said winding current is less than a second predetermined level;
   d. uncoupling the first terminal from the first supply voltage conductor in response to said second control signal and maintaining the first terminal uncoupled from the first supply voltage conductor, causing said winding current to decrease until said winding current falls below said second predetermined level; and
   e. repeating steps (a) through (c) to produce a predetermined average current in the winding to effect moving of the rotor from said first step position toward said second step position.

2. The method of claim 1 wherein said DC level is substantially less than said average current.

3. The method of claim 1 wherein step (f) is performed before the rotor attains a hold position at said second step position.

4. The method of claim 3 wherein step (f) is performed a sufficiently long time before the rotor attains said second step position to limit the extent of overshoot of the rotor beyond said second step position to no more than a predetermined value.

5. The method of claim 3 wherein step (f) is performed a sufficiently long interval of time before the rotor attains said second step position to enable friction associated with the rotor and the load connected to said rotor to dampen the mechanical oscillation of the rotor about said second step position within a predetermined damping time.

6. The method of claim 1 wherein the stepping motor includes a plurality of windings, each having one lead connected to the first terminal and each having a second lead, said method including the step of selecting one of said windings by coupling its second lead to a current receiving circuit to provide a return path for the varying winding current in the selected winding.

7. The method of claim 6 wherein said sensing step includes sensing current flowing out of the second lead of the select winding.

8. The method of claim 1 further including the steps of:
   uncoupling the first terminal from the first supply voltage conductor after an interval of time;
   coupling the first terminal to a second supply voltage conductor to produce a holding current in the winding, the voltage of said first supply voltage conductor being substantially greater than the voltage of said second voltage supply conductor; and
   limiting said holding current to a substantially constant DC level to effect producing of a holding force tending to hold the rotor in said second step position.

9. A stepping motor driver circuit for advancing the rotor of a stepping motor from a first step position to a second step position, said stepping motor drive circuit comprising in combination:
   a. first switching means for alternately, repetitively coupling a first terminal of a winding of the stepping motor to a first voltage supply conductor in response to a first control signal to increase a winding current in the winding until the winding current attains a first predetermined level, uncoupling the first terminal from the first supply voltage conductor in response to a second control signal, to decrease said winding current and maintaining the first terminal uncoupled from the first supply voltage conductor until said winding current falls below a second predetermined level, said stepping motor driver circuit thereby producing a predetermined average current in the winding to effect moving of the rotor from said first step position toward said second step position; and
   b. sensing means responsive to said winding current for producing said first and second control signals, said second control signal indicating when said winding current exceeds a first predetermined level, and said first control signal indicating when said winding current is less than said second predetermined level, said first predetermined level being greater than said second predetermined level.

10. The stepping motor driver circuit of claim 9 wherein the stepping motor includes a plurality of windings, each having a first lead connected to the first terminal and each having a second lead, said stepping motor drive circuit further including selection means connected to said respective second leads for selectively receiving winding current from one of said plurality of windings, said selection means including a plurality transistors coupled, respectively, to the second leads.

11. The stepping motor driver circuit of claim 10 wherein said first switching means includes a first transistor coupled between the first terminal and the first voltage supply conductor, the base of said first transistor being coupled to said sensing means to receive said first control signal.

12. The stepping motor driver circuit of claim 11 wherein said sensing means includes a resistor having one terminal connected to the emitters of said selection transistors and another lead connected to a reference voltage supply conductor, the collectors of said selection transistors being connected, respectively, to the second leads.

13. The stepping motor driver circuit of claim 12 wherein said second switching means is coupled to the base of said first transistor for turning off said first transistor in response to a power down control signal applied to said stepping motor driver circuit.

14. The stepping motor driver circuit of claim 13 further including an optical coupler coupled to said second switch means for coupling said power down control signal to said stepping motor driver circuit.

15. The stepping motor driver circuit of claim 9 further including:
   second switching means for uncoupling the first terminal from the first supply voltage conductor after an interval of time;
   third switching means for coupling the first terminal to a second supply voltage conductor to produce a holding current in the winding, the voltage of said first supply voltage conductor being substantially greater than the voltage of said second voltage supply conductor; and
   current limiting means for limiting said holding current to a DC level to effect producing of a holding force tending to hold the rotor in said second step position.

16. The stepping motor driver circuit of claim 15 wherein said current limiting means includes a diode and a resistor coupled in series between the first terminal and the said second supply voltage conductor, whereby said diode isolates said first terminal from said resistor when said first transistor is being alternately turned on and off to maintain said average current in the selected winding.

* * * * *